(12) United States Patent
Urbanek et al.

(10) Patent No.: US 12,306,060 B2
(45) Date of Patent: May 20, 2025

(54) SENSOR DEVICE WITH A COMBINED FORCE AND CAPACITANCE SENSOR

(71) Applicant: TACTERION GMBH, Munich (DE)

(72) Inventors: Holger Urbanek, Munich (DE); Michael Wolfgang Strohmayr, Augsburg (DE); Conrad Helminger, Munich (DE); Alexander Römmelt, Munich (DE)

(73) Assignee: Tacterion GmbH, Munich (DE)

( * ) Notice: Subject to any disclaimer, the term of this patent is extended or adjusted under 35 U.S.C. 154(b) by 418 days.

(21) Appl. No.: 17/775,072

(22) PCT Filed: Nov. 24, 2020

(86) PCT No.: PCT/EP2020/083159
§ 371 (c)(1),
(2) Date: May 6, 2022

(87) PCT Pub. No.: WO2021/105097
PCT Pub. Date: Jun. 3, 2021

(65) Prior Publication Data
US 2022/0390306 A1 Dec. 8, 2022

(30) Foreign Application Priority Data
Nov. 27, 2019 (DE) ...................... 10 2019 132 103.4

(51) Int. Cl.
*G01L 5/165* (2020.01)
*G01L 5/00* (2006.01)
(Continued)

(52) U.S. Cl.
CPC ............ *G01L 5/165* (2013.01); *G01L 5/0028* (2013.01); *G01L 5/009* (2013.01); *G01L 1/146* (2013.01); *G06F 3/044* (2013.01)

(58) Field of Classification Search
USPC .......................................................... 702/41
See application file for complete search history.

(56) References Cited

U.S. PATENT DOCUMENTS

2003/0060957 A1 3/2003 Okamura et al.
2010/0024573 A1* 2/2010 Daverman ............ G06F 3/0443
73/862.626
(Continued)

FOREIGN PATENT DOCUMENTS

DE 102018001305 A1 8/2019

OTHER PUBLICATIONS

English-language translation of International Preliminary Report on Patentability issued in International Application No. PCT/EP2020/083159 on Jun. 9, 2022.

*Primary Examiner* — Paul D Lee
(74) *Attorney, Agent, or Firm* — Hoffmann & Baron, LLP

(57) ABSTRACT

A sensor device with a combined sensor to detect a force applied to the sensor by an object made of a material, a position of the force, and a capacitive coupling of the sensor with the object, including: a database to provide relationships $Z_n$ of a capacitive coupling $C_{SEN-OBJ-MATn}$ of the sensor with an object OBJ made of a material $MAT_n$ for a number N of materials $MAT_n$, the relationships depending on a force $F_{ext,OBJ}$ of the object OBJ applied to the sensor, wherein n=1, 2, . . . , N and N≥1; a detection unit to determine force $F_{ext}(t)$, position $POS_{Fext}(t)$, and capacitive coupling $C_{SEN-OBJ}(t)$ from sensor data of the sensor; an evaluation unit to determine a material MAT* of the object OBJ applying the force $F_{ext}(t)$ to the sensor based on the relationships $Z_n$, wherein MAT*∈$MAT_n$; and an output unit to output the material MAT*.

10 Claims, 2 Drawing Sheets

(51) Int. Cl.
    *G01L 1/14*     (2006.01)
    *G06F 3/044*     (2006.01)

(56) References Cited

U.S. PATENT DOCUMENTS

| | | |
|---|---|---|
| 2015/0019013 A1 | 1/2015 | Rose et al. |
| 2015/0091859 A1* | 4/2015 | Rosenberg ............ G06F 3/0446 |
| | | 345/174 |
| 2017/0068383 A1* | 3/2017 | Chern .................... G06F 3/044 |
| 2019/0001492 A1 | 1/2019 | Rose et al. |

* cited by examiner

SENSOR DEVICE WITH A COMBINED FORCE AND CAPACITANCE SENSOR

CROSS-REFERENCE TO RELATED APPLICATIONS

The present application is the U.S. National Phase of PCT/EP2020/083159, filed on 24 Nov. 2020, which claims priority to German Patent Application No. 10 2019 132 103.4, filed on 27 Nov. 2019, the entire contents of which are incorporated herein by reference.

BACKGROUND

Field

The invention relates to sensor devices, and in particular, relates to a sensor device with a combined sensor adapted and configured for detecting a mechanical force applied to the sensor by an object made of a material, a position of the force input on the sensor, and an electrical capacitive coupling of the sensor with the object made of the material MAT. The invention also particularly relates to a method of operating such a sensor device.

Related Art

Sensor devices with force sensors for measuring a force applied to the sensor (for example, resistive sensors with an array of sensor elements, so-called taxels) and capacitance sensors for measuring an electrical capacitive coupling of a sensor to an object are known in the prior art.

SUMMARY

The object of the invention is to specify a sensor device that allows to determine a material MAT of an object OBJ that applies a force $F_{ext}$ to a force sensor of the sensor device as precisely as possible.

The invention results from the features of the independent claims. Advantageous refinements and embodiments are the subject matter of the dependent claims. Other features, applications, and advantages of the invention will be apparent from the following description, and from the discussion of example embodiments of the invention, which are depicted in the figures.

An aspect of the invention relates to a sensor device with a combined sensor that is adapted and configured for simultaneously detecting a mechanical force $F_{ext}$ applied to the sensor by an object OBJ made of a material MAT, a position $POS_{Fext}$ of the force input $F_{ext}$ to the sensor and an electrical capacitive coupling $C_{SEN-OBJ}$ of the sensor with the object OBJ made of the material MAT, the sensor device including: a database to provide relationships $Z_n$ of the capacitive coupling $C_{SEN-OBJ-MATn}$ of the sensor with an object OBJ made of a material $MAT_n$ for a number N of specified materials $MAT_n$ depending on a mechanical force $F_{ext,OBJ}$ that the object OBJ applies to the sensor, wherein n=1, 2, ..., N and N≥1; a detection unit to detect current values: force $F_{ext}(t)$, position $POS_{Fext}(t)$ and capacitive coupling $C_{SEN-OBJ}(t)$ from sensor data of the sensor; an evaluation unit to determine material MAT* of the object OBJ, which applies the force $F_{ext}(t)$ to the sensor, based on the relationships $Z_n$, wherein MAT*∈$MAT_n$; and an output unit to output the determined material MAT*.

The output unit is advantageously designed in such a way that the detected external force $F_{ext}(t)$ and/or the position $POS_{Fext}(t)$ of the force input $F_{ext}(t)$ is output as well.

The invention is based in particular on the knowledge that the capacitive coupling $C_{SEN-OBJ}(t)$ of the combined sensor with an object OBJ depends on the force $F_{ext}(t)$ which the object OBJ applies to the sensor. This is due, on the one hand, to a change in the sensor's own capacitance and/or to a change in the object's own capacitance, in each case due to the respective force effect. In particular, the determination of the material MAT* of an object OBJ is significantly improved and made more robust by taking these relationships into account.

The relationships $Z_n$ are advantageously determined beforehand by respective reference measurements. In this case, objects made of known materials act with known forces $F_{ext}$ on the combined sensor, wherein the capacitive coupling is determined in each case depending on the object material and the force $F_{ext}$. The reference measurement results determined in this way are advantageously made available, for example, as a look-up table or as a functional relationship in the database.

Based on the knowledge that the capacitive coupling is dependent on the measuring frequency $F_U$ that is used during the measurement of the capacitive coupling, an advantageous refinement of the proposed sensor device results from the fact that the relationships $Z_n$ provided by the database each include a dependency of the capacitive coupling $C_{SEN-OBJ-MATn}(F_U)$ on a frequency $F_U$ of a measurement voltage U of the sensor: $Z_n=Z_n(F_u)$, and that the output unit determines and outputs the capacitive coupling $C_{SEN-OBJ,Fu}(t)$ for different frequencies $F_U$.

The evaluation unit advantageously uses the relationships $Z_n(F_U)$ to determine the material MAT*, wherein the detection unit determines the sensor data: $F_{ext}(t)$, $POS_{Fext}(t)$ and $C_{SEN-OBJ,Fu}(t)$ beforehand for different frequencies $F_U$. The evaluation unit is thus advantageously able to detect different materials significantly more distinctively and robustly.

Another aspect of the invention relates to a gripping device, which has a sensor device as described above. The gripping device can have, for example, one or more gripper jaws, wherein the gripper jaws each have at least one combined sensor, as described above. The gripping device can be configured, in particular, as an end effector on a robot manipulator. Such gripping devices make it possible, in particular, to determine a material MAT from which a gripped or held object is made while this object is being manipulated.

Another aspect of the invention relates to a machine, in particular, a machine tool (such as a drilling machine, a chainsaw, a sawing machine, a planing machine, a grinder, a food processor, etc. . . . ) which is designed to be manipulated by a person, and which has a sensor device as described above. Such a machine advantageously has the combined sensor at a handling interface of the machine. Furthermore, the machine advantageously has a switching logic that only allows the machine to be put into operation when the sensor device detects that the handling interface, i.e., in particular, the combined sensor arranged there, is subjected to a predetermined minimum force $F_{ext, min}$ by an object from a predetermined material MAT". In this way, various safety concepts can be implemented for the operation or commissioning of machines.

Another aspect of the invention relates to a method of operating a sensor device with a combined sensor that is adapted and configured to simultaneously detect a mechanical force $F_{ext}$ applied to the sensor by an object OBJ made of a material MAT, a position $POS_{Fext}$ of the force input $F_{ext}$ to the sensor and an electrical capacitive coupling $C_{SEN-OBJ}$ of the sensor to the object OBJ made of the material MAT, wherein the method includes the following steps.

In one step, relationships $Z_n$ of the capacitive coupling $C_{SEN-OBJ-MATn}$ of the sensor with an object OBJ made of a material $MAT_n$ are provided for a number N of specified materials $MAT_n$ as a function of a mechanical force $F_{ext,OBJ}$, which the object OBJ applies to the sensor (101), wherein n=1, 2, ..., N and N≥1.

In another step, the sensor is used to detect current values: force $F_{ext}(t)$, position $POS_{Fext}(t)$ and capacitive coupling $C_{SEN-OBJ}(t)$.

In another step, based on the relationships $Z_n$, the material MAT* of the object OBJ, which applies the force $F_{ext}(t)$ to the sensor, is determined, wherein MAT*∈$MAT_n$.

In another step, the determined material MAT* is output.

In addition, the detected external force $F_{ext}(t)$ and/or the position $POS_{Fext}(t)$ of the force input is advantageously output on the sensor.

An advantageous refinement of the proposed method is characterized in that the relationships $Z_n$ include a dependency of the capacitive coupling $C_{SEN-OBJ-MATn,Fu}$ on a frequency $F_U$ of a measurement voltage of the sensor: $Z_n = Z_n(F_u)$, and includes determining and outputting $C_{SEN-OBJ,Fu}(t)$ for different frequencies $F_U$.

The proposed method enables a more robust and more accurate determination of the determined material MAT* of an object that touches the sensor and applies a force $F_{ext}$ to the sensor. The proposed combined sensor enables the implementation of safety concepts, for example, when operating machines or devices.

If, for example, such a combined sensor is integrated on the surface of a machine in the area in which the machine is manipulated (gripped/operated) by humans, the proposed sensor device can be used to determine whether a human (biological material) touches the operating area of the machine (and applies an appropriate force on the operating area) or an object made of another material. Depending on this, the behavior of the machine can be programmed differently, for example.

Furthermore, operating functions of a machine can be implemented which are dependent on the material with which a combined sensor according to the invention installed on the machine is touched. For example, a chainsaw with a sensor device according to the invention and a combined sensor arranged on the operating handle of the chainsaw can detect whether the chainsaw is being gripped on the operating handle with an object made of a specific material, e.g., a cut-resistant glove made of a specific material, wherein the chainsaw only then allows operation when the specific, i.e., specified, material is detected.

Further advantages, features, and details will be apparent from the following description, in which—possibly with reference to the drawings—at least one example embodiment is described in detail. The same, similar, and/or functionally identical parts are provided with the same reference numerals.

DETAILED DESCRIPTION

Figure 1:
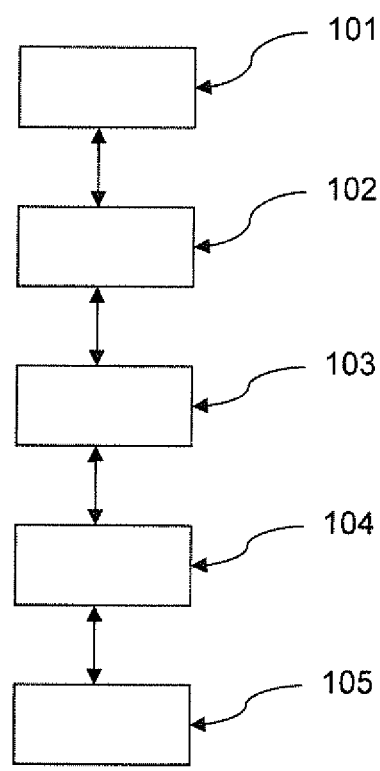
FIG. 1 shows a highly schematic structure of a sensor device according to the invention.

FIG. 1 shows a highly schematic structure of a sensor device according to the invention. In particular, there is provided a sensor device with a combined sensor (101) adapted and configured for simultaneously detecting a mechanical force $F_{ext}$ applied to the combined sensor (101) by an object OBJ made of a material MAT, a position $POS_{Fext}$ of the force input $F_{ext}$ to the sensor (101), and an electrical capacitive coupling $C_{SEN-OBJ}$ of the sensor (101) with the object OBJ made of the material MAT, the sensor device including: a database (102) to provide relationships $Z_n$ of the capacitive coupling $C_{SEN-OBJ-MATn}$ of the sensor (101) with an object OBJ made of a material $MAT_n$ for a number N of specified materials $MAT_n$ as a function of a mechanical force $F_{ext,OBJ}$ that the object OBJ applies to the sensor (101), wherein n=1, 2, ..., N and N≥1; a detection unit (103) to detect the current values: force $F_{ext}(t)$, position $POS_{Fext}(t)$, and capacitive coupling $C_{SEN-OBJ}(t)$ from sensor data of the sensor (101); an evaluation unit (104) to determine a material MAT* of the object OBJ that applies the force $F_{ext}(t)$ to the sensor (101) based on the relationships $Z_n$, wherein MAT*∈$MAT_n$; and an output unit (105) to output the determined material MAT*. The force $F_{ext}(t)$ and the position $POS_{Fext}(t)$ of the force can also be output.

Figure 2:
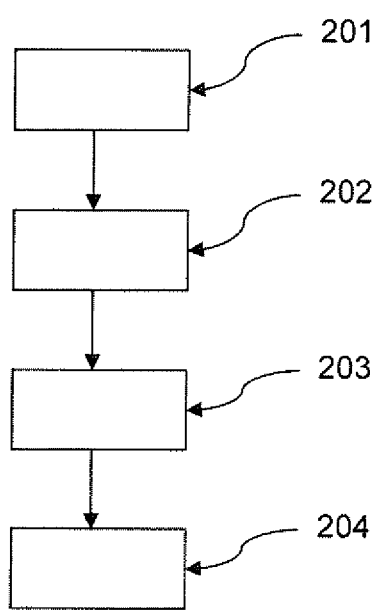
FIG. 2 shows a highly schematized flowchart of a method according to the invention.

FIG. 2 shows a highly schematized flowchart of a method according to the invention. In particular, there is provided a method of operating a sensor device with a combined sensor (101) which is adapted and configured for simultaneously detecting a mechanical force $F_{ext}$ applied to the sensor (101) by an object OBJ made of a material MAT, a position $POS_{Fext}$ of the force input $F_{ext}$ to the sensor (101), and an electrical capacitive coupling $C_{SEN-OBJ}$ of the sensor (101) with the object OBJ made of the material MAT, the method including: providing (201) relationships $Z_n$ of the capacitive coupling $C_{SEN-OBJ-MATn}$ of the sensor (101) with an object OBJ made of a material $MAT_n$ for a number N of specified materials $MAT_n$ as a function of a mechanical force $F_{ext,OBJ}$ that the object OBJ applies to the sensor (101), wherein n=1, 2, ..., N and N≥1; detecting (202) current values: force $F_{ext}(t)$, position $POS_{Fext}(t)$, and capacitive coupling $C_{SEN-OBJ}(t)$ with the sensor (101); determining (203) a material MAT* of the object OBJ that applies the force $F_{ext}(t)$ on the sensor (101), wherein MAT*∈$MAT_n$, based on the relationships $Z_n$; and outputting (204) the determined material MAT*. The force $F_{ext}(t)$ and the position $POS_{Fext}(t)$ of the force can also be output.

Although the invention has been further illustrated and described in detail by way of preferred example embodiments, the invention is not limited by the disclosed examples, and other variations can be derived therefrom by a person skilled in the art without departing from the scope of the invention. It is therefore clear that there is a multitude of possible variations. It is also clear that example embodiments are really only examples, which are not to be construed in any way as limiting the scope, applicability, or configuration of the invention. Rather, the foregoing description and description of the figures enable a person skilled in the art to implement the example embodiments, and such person may make various changes knowing the disclosed inventive concept, for example, with respect to the function or arrangement of individual elements cited in an example embodiment, without departing from the scope as defined by the claims and their legal equivalents, such as a more extensive explanation in the description.

LIST OF REFERENCE NUMERALS 101 combined sensor
102 database
103 detection unit
104 evaluation unit
105 output unit
201-204 method steps

The invention claimed is:

1. A machine comprising:
a handling interface configured to be handled;
a sensor device comprising:
  a combined sensor arranged in association with the handling interface and configured to simultaneously detect a mechanical force $F_{ext}$ applied to the sensor by an object OBJ made of a material MAT, a position $POS_{Fext}$ of the mechanical force $F_{ext}$ applied to the sensor, and an electrical capacitive coupling $C_{SEN-OBJ}$ of the sensor with the object OBJ made of the material MAT;
  a database configured to provide relationships $Z_n$ of a capacitive coupling $C_{SEN-OBJ-MATn}$ of the sensor with the object OBJ made of a material $MAT_n$ for a number N of specified materials $MAT_n$ as a function of a mechanical force $F_{ext,OBJ}$ that the object OBJ applies to the sensor, wherein n=1, 2, ..., N and N≥1;
  a detection unit configured to detect current values of the sensor for a time t: force $F_{ext}(t)$, position $POS_{Fext}(t)$, and capacitive coupling $C_{SEN-OBJ}(t)$ from sensor data of the sensor;
  an evaluation unit configured to determine a material MAT* of the object OBJ that applies the force $F_{ext}(t)$ to the sensor based on the capacitive coupling $C_{SEN-OBJ}(t)$ as identified in the relationships $Z_n$, wherein MAT*∈$MAT_n$; and
  an output unit configured to output the material MAT* of the object OBJ associated with the sensor's detection; and
switching logic configured to generate a signal controlling the machine to allow operation of the machine at least when the material MAT* of the object OBJ matches a predetermined material.

2. The sensor device according to claim 1, wherein the relationships $Z_n$ provided by the database include a dependency of the capacitive coupling $C_{SEN-OBJ-MATn}$ on a frequency $F_U$ of a measurement voltage of the sensor: $Z_n=Z_n(F_u)$, and the output unit is further configured to determine and output the capacitive coupling $C_{SEN-OBJ}(t)$ for different frequencies $F_U$.

3. The machine according to claim 1, wherein the machine is a drilling machine, a chainsaw, a sawing machine, a planning machine, a grinder, a food processor, or another machine.

4. The machine according to claim 1, wherein the switching logic is further configured to generate the signal controlling the machine to allow operation of the machine when the material MAT* of the object OBJ matches the predetermined material, the force $F_{ext}(t)$ matches a predetermined minimum force, and the position $POS_{Fext}(t)$ of the force $F_{ext}(t)$ is within an operating area of the handling interface.

5. The machine according to claim 1, wherein the handling interface is an operating handle configured to be handled by a human to operate the machine.

6. A method of operating a machine, the method comprising:
simultaneously detecting, via a combined sensor arranged in association with a handling interface of the machine, a mechanical force $F_{ext}$ applied to the sensor by an object OBJ made of a material MAT, a position $POS_{Fext}$ of the mechanical force $F_{ext}$ applied to the sensor, and an electrical capacitive coupling $C_{SEN-OBJ}$ of the sensor with the object OBJ made of the material MAT;
providing relationships $Z_n$ of a capacitive coupling $C_{SEN-OBJ-MATn}$ of the sensor with the object OBJ made of a material $MAT_n$ for a number N of specified materials $MAT_n$ as a function of a mechanical force $F_{ext,OBJ}$ that the object OBJ applies to the sensor, wherein n=1, 2, ..., N and N≥1;
detecting current values of the sensor for a time t: force $F_{ext}(t)$, position $POS_{Fext}(t)$, and capacitive coupling $C_{SEN-OBJ}(t)$ with the sensor,
determining a material MAT* of the object OBJ that applies the force $F_{ext}(t)$ on the sensor based on the capacitive coupling $C_{SEN-OBJ}(t)$ as identified in the relationships $Z_n$, wherein MAT*∈$MAT_n$;
outputting the material MAT* of the object OBJ associated with the sensor's detection; and
generating a signal, via switching logic of the machine, controlling the machine to allow operation of the machine at least when the material MAT* of the object OBJ matches a predetermined material.

7. The method according to claim 6, wherein the relationships $Z_n$ include a dependency of the capacitive coupling $C_{SEN-OBJ-MATn}$ on a frequency $F_U$ of a measurement voltage of the sensor: $Z_n=Z_n(F_u)$, and the method further comprises determining and outputting $C_{SEN-OBJ,Fu}(t)$ for different frequencies $F_U$.

8. The method according to claim 6, wherein the machine is a drilling machine, a chainsaw, a sawing machine, a planning machine, a grinder, a food processor, or another machine.

9. The method according to claim 6, wherein the method further comprises generating the signal, via the switching logic, controlling the machine to allow operation of the machine when the material MAT* of the object OBJ matches the predetermined material, the force $F_{ext}(t)$ matches a predetermined minimum force, and the position $POS_{Fext}(t)$ of the force $F_{ext}(t)$ is within an operating area of the handling interface.

10. The method according to claim 6, wherein the handling interface is an operating handle configured to be handled by a human to operate the machine.

* * * * *